United States Patent
Chari et al.

(10) Patent No.: US 7,507,449 B2
(45) Date of Patent: Mar. 24, 2009

(54) DISPLAYS WITH LOW DRIVING VOLTAGE AND ANISOTROPIC PARTICLES

(75) Inventors: Krishnan Chari, Fairport, NY (US); David M. Johnson, West Henrietta, NY (US); Charles M. Rankin, Jr., Penfield, NY (US); Glen C. Irvin, Jr., Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 244 days.

(21) Appl. No.: 11/442,811

(22) Filed: May 30, 2006

(65) Prior Publication Data

US 2007/0278448 A1 Dec. 6, 2007

(51) Int. Cl.
*C09K 19/00* (2006.01)
*C09K 19/52* (2006.01)

(52) U.S. Cl. .......................... 428/1.1; 428/1.2; 428/1.3; 430/20; 252/299.01

(58) Field of Classification Search ............ 252/299.01; 428/1.1–1.3; 430/20, 270.1
See application file for complete search history.

(56) References Cited

U.S. PATENT DOCUMENTS

| | | | |
|---|---|---|---|
| 2,992,109 | A | 7/1961 | Allen |
| 2,994,611 | A | 8/1961 | Heyna et al. |
| 3,232,763 | A | 2/1966 | Burness et al. |
| 3,360,372 | A | 12/1967 | Burness et al. |
| 3,490,911 | A | 1/1970 | Burness et al. |
| 3,600,060 | A | 8/1971 | Kettering et al. |
| 3,635,718 | A | 1/1972 | Froehlich et al. |
| 3,640,720 | A | 2/1972 | Cohen |
| 3,642,486 | A | 2/1972 | Burness et al. |
| 3,689,274 | A | 9/1972 | Sobel et al. |
| 3,841,872 | A | 10/1974 | Burness et al. |
| 4,126,854 | A | 11/1978 | Sheridon |
| 4,171,976 | A | 10/1979 | Burness et al. |
| 4,435,047 | A | 3/1984 | Fergason |
| 4,688,900 | A | 8/1987 | Doane et al. |
| 5,363,482 | A | 11/1994 | Victor et al. |
| 5,437,811 | A | 8/1995 | Doane et al. |
| 5,453,863 | A | 9/1995 | West et al. |
| 5,667,853 | A | 9/1997 | Fukuyoshi et al. |
| 5,703,436 | A | 12/1997 | Forrest et al. |
| 5,748,277 | A | 5/1998 | Huang et al. |
| 5,835,174 | A | 11/1998 | Clikeman et al. |
| 6,025,896 | A | 2/2000 | Hattori et al. |
| 6,055,091 | A | 4/2000 | Sheridon et al. |
| 6,061,107 | A | 5/2000 | Yang et al. |
| 6,099,751 | A | 8/2000 | Meyer et al. |
| 6,104,448 | A | 8/2000 | Doane et al. |
| 6,147,791 | A | 11/2000 | Sheridon |
| 6,217,792 | B1 | 4/2001 | Parri et al. |
| 6,269,225 | B1 | 7/2001 | Sato et al. |
| 6,271,898 | B1 | 8/2001 | Clikeman et al. |
| 6,423,368 | B1 | 7/2002 | Stephenson et al. |
| 6,424,387 | B2 | 7/2002 | Sato et al. |
| 6,556,262 | B1 | 4/2003 | Stephenson et al. |
| 6,704,073 | B2 | 3/2004 | Stephenson et al. |
| 6,924,781 | B1 | 8/2005 | Gelbman |
| 7,052,743 | B2 | 5/2006 | Welter et al. |
| 7,414,313 | B2 | 8/2008 | Majumdar et al. |
| 2001/0006389 | A1 | 7/2001 | Nanba et al. |
| 2001/0008582 | A1 | 7/2001 | Sato et al. |
| 2003/0137717 | A1 | 7/2003 | Albert et al. |
| 2003/0227441 | A1 | 12/2003 | Hioki et al. |
| 2004/0217929 | A1 | 11/2004 | Albert et al. |
| 2004/0226820 | A1 | 11/2004 | Webber et al. |
| 2005/0110925 | A1 | 5/2005 | Chari et al. |
| 2006/0088698 | A1 | 4/2006 | Majumdar et al. |
| 2006/0134349 | A1 * | 6/2006 | Chari et al. .................. 428/1.1 |
| 2006/0188721 | A1 | 8/2006 | Irvin, Jr. et al. |
| 2006/0286309 | A1 * | 12/2006 | Chari et al. .................. 428/1.1 |

FOREIGN PATENT DOCUMENTS

| | | |
|---|---|---|
| WO | WO 92/03504 A1 | 3/1992 |
| WO | WO 92/09367 A1 | 6/1992 |
| WO | WO 98/19208 A2 | 5/1998 |
| WO | WO 98/41898 A2 | 9/1998 |
| WO | WO 98/41899 A2 | 9/1998 |
| WO | WO 99/36261 A1 | 7/1999 |
| WO | WO 00/29177 A1 | 5/2000 |

OTHER PUBLICATIONS

U.S. Appl. No. 11/017,181, filed Dec. 20, 2004, Chari et al.

(Continued)

*Primary Examiner*—Geraldina Visconti
(74) *Attorney, Agent, or Firm*—Alston & Bird LLP

(57) ABSTRACT

The present invention relates to a high contrast reflective display comprising a substrate, at least one electronically modulated imaging layer, wherein the electronically modulated imaging layer comprises a uniformly thick, close-packed, ordered monolayer of domains of electrically modulated material in a fixed polymer matrix, at least one barrier layer, wherein the barrier layer is conductive in a direction perpendicular to the substrate, and at least one electrically conductive layer. The invention also relates to a method of making the display with a barrier layer comprising anisotropic particles and orienting the anisotropic conductor to produce a barrier layer conductive in a direction perpendicular to the substrate.

40 Claims, 4 Drawing Sheets

OTHER PUBLICATIONS

Drzaic, P.S. in Liquid Crystal Dispersions, pp. 30-51, published by World Scientific, Singapore (1995).

Whitesides and Ross (J. Colloid Interface Sci. 169, pp. 48-59 (1995)).

Rudhardt et al. (Applied Physics Letters vol. 82, pp. 2610-2612, 2003).

U.S. Appl. No. 60/099,888, filed Sep. 11, 1998; In re: Gelbman entitled *Remotely Updatable and Alterable Electronic Display Based Products and Systems*.

Chu, P. Y. Z. et al., *42.2: A New Conductor Structure for Plastic LCD Applications Utilizing 'All Dry' Digital Laser Patterning*, 1998 SID International Symposium Digest of Technical Papers, Anaheim, CA, May 17-22, 1998, No. vol. 29, May 17, 1998, pp. 1099-1101.

Gottarelli, G. et al., *Induced Cholesteric Mesophases: Orgin and Application*, Mol. Cryst. Liq. Crys., vol. 123, 1985, pp. 377-388.

Spada, G. and Proni G., *The Nematic Liquid Crystal Phase as a Probe of the Molecular Shape Helicity*, Enantiomer, 3, 301-314, 1998.

Yang, D. K. et al., *Cholesteric Liquid Crystal/Polymer Dispersion for Haze-Free Light Shutters*, J. Appl. Phys. Lett. 60(25), Jun. 1992, pp. 3102-3104.

Doane, J. W. et al., *Field Controlled Light Scattering From Nematic Microdroplets*, Applied Physics Letters, 48(4), 1986, pp. 269-271.

West, J. L. et al., *Cholesteric/Polymer Dispersed Light Shutters*, Applied Physics Letters 63(11), 1993, pp. 1471-1473.

Yang, K. D. et al., *Control of Reflectivity and Bistability in Displays Using Cholesteric Liquid Crystals*, American Institute of Physics, J. Appl. Phys. 76(2), Jul. 1994, pp. 1331-1333.

Giermanska-Kahn, J. et al., *A New Method to Prepare Monodisperse Pickering Emulsions*, American Chemical Society, vol. 18, 2002, pp. 2515-2518.

Yang, D. et al., *Modelling of the Reflection of Cholesteric Liquid Crystals Using the Jones Matrix*, J. Phys. D: Appl. Phys. 33, 2000, pp. 672-676.

Kumacheva, E. et al., *Two-Dimensional Colloid Crystals Obtained by Coupling of Flow and Confinement*, Physical Review Letters, vol. 91, No. 12, Sep. 2003, pp. 128301-1-128301-4.

Lisensky, G. C. et al., *The Optical Transform—Simulating Diffraction Experiments in Introductory Courses*, Journal of Chemical Education, vol. 68, No. 2, 1991, pp. 91-96.

*Photographic Silver Halide Emulsions, Preparations, Addenda, Processing and Systems*, Research Disclosure, Dec. 1989, pp. 993-1015.

Doane, J. W. et al., *Front-Lit Flat Panel Display from Polymer Stabilized Cholesteric Textures*, S3-6, Japan Display 1992, pp. 73-76.

Yang, D. K. et al., *Cholesteric Liquid-Crystal/Polymer-Gel Dispersions: Reflective Display Applications*, 40.1: Invited Address, SID Digest, 1992, pp. 759-761.

*The Theory of the Photographic Process*, Fourth Edition, Macmillan Publishing Co., Inc. 1977, Ch. 2, Gelatin, p. 82.

*The Theory of the Photographic Process*, Fourth Edition, Macmillian Publishing Co., Inc., New York, 1977, Sec. III.B, Organic Hardeners, p. 83.

\* cited by examiner

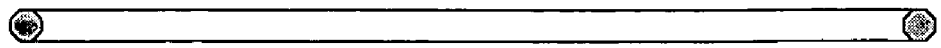
FIG 1a). Pristine SWCNT with closed ends
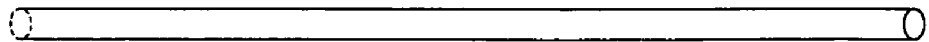
FIG 1b). Pristine SWCNT with open ends
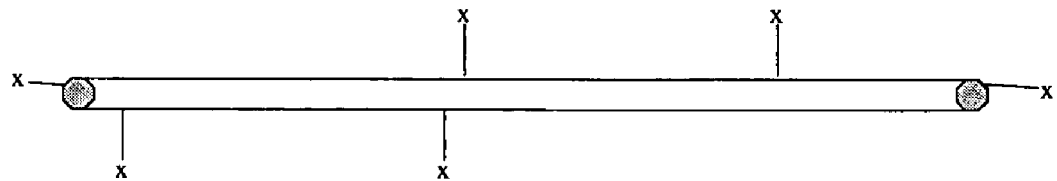
FIG 2a). Functionalized SWCNT with closed ends
FIG 2b). Functionalized SWCNT with open ends

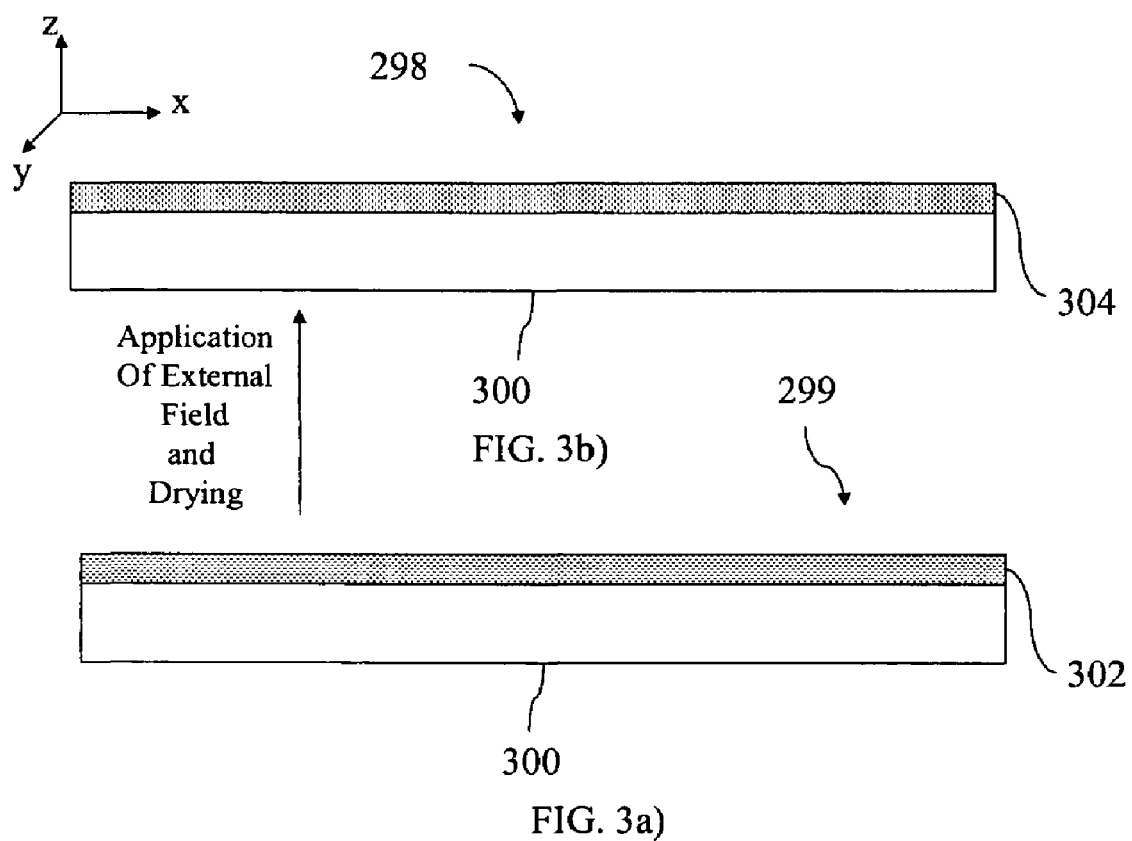

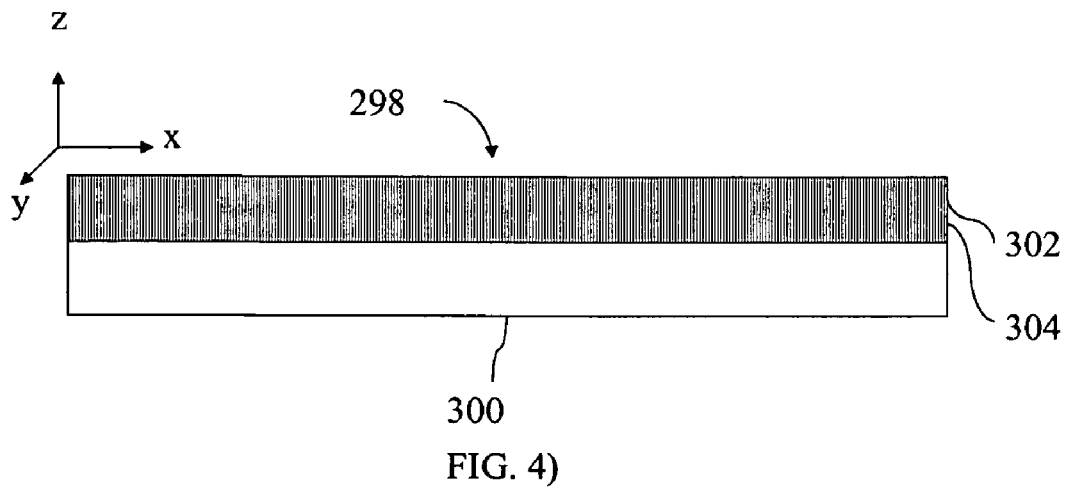
FIG. 4)
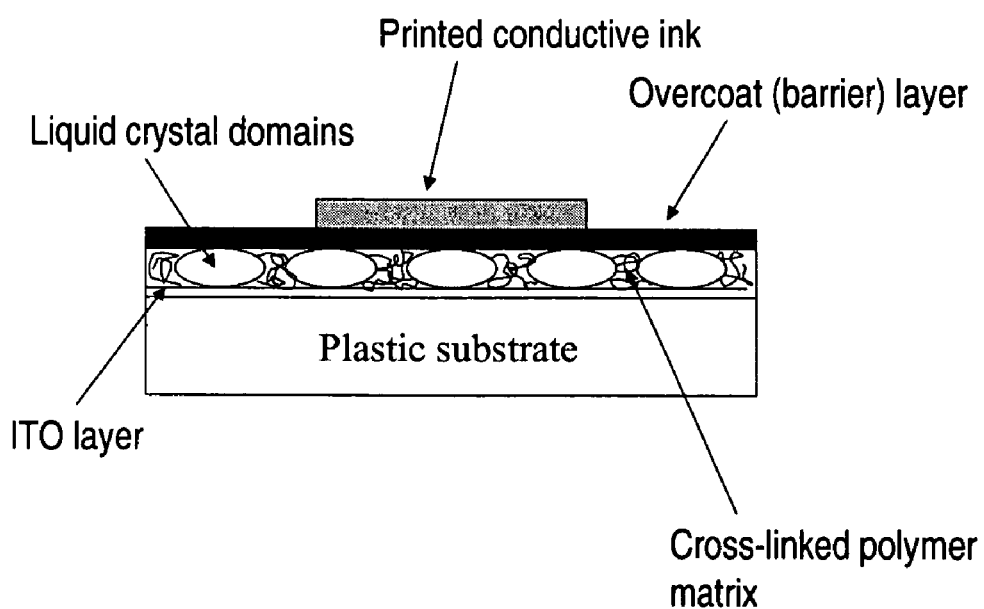
FIG. 5

DISPLAYS WITH LOW DRIVING VOLTAGE AND ANISOTROPIC PARTICLES

FIELD OF THE INVENTION

The present invention relates to a high contrast displays.

BACKGROUND OF THE INVENTION

There is significant interest in low cost flexible electronic displays. Typically, such displays comprise a light modulating component embedded in a binder, most commonly polymer, matrix that is coated over a conductive plastic support. Broadly speaking, a light modulating component is a material that changes its optical properties such as its ability to reflect or transmit light in response to an electric field. The light modulating component may be a liquid crystalline material such as a nematic liquid crystal, a chiral nematic or cholesteric liquid crystal or a ferroelectric liquid crystal. The light modulating material may also be a water insoluble liquid containing particles that undergo electrophoresis or motion such as rotation or translation in response to an electric field. Displays comprising a liquid crystalline material in a polymer matrix are referred to as polymer dispersed liquid crystal (PDLC) displays.

There are two main methods for fabricating PDLC devices: emulsion methods and phase separation methods. Emulsion methods have been described in U.S. Pat. Nos. 4,435,047 and 5,363,482. The liquid crystal is mixed with an aqueous solution containing polymer. The liquid crystal is insoluble in the continuous phase and an oil-in-water emulsion is formed when the composition is passed through a suitable shearing device, such as a homogenizer. The emulsion is coated on a conductive surface and the water allowed to evaporate. A second conductive surface may then be placed on top of the emulsion or imaging layer by lamination, vacuum deposition, or screen printing to form a device. While the emulsion methods are straightforward to implement, droplet size distributions tend to be broad resulting in a loss in performance. For cholesteric liquid crystal devices, also referred to herein as CLC devices, this typically means reduced contrast and brightness. Phase separation methods were introduced in an effort to overcome this difficulty.

Phase separation methods have been outlined in U.S. Pat. No. 4,688,900 and in Drzaic, P. S. in Liquid Crystal Dispersions, pgs. 30-51, published by World Scientific, Singapore (1995). The liquid crystal and polymer, or precursor to the polymer, are dissolved in a common organic solvent. The composition is then coated on a conductive surface and induced to phase separate by application of ultraviolet (UV) radiation or by the application of heat or by evaporation of the solvent, resulting in droplets of liquid crystal in a solid polymer matrix. A device may then be constructed utilizing this composition. Although phase separation methods produce dispersed droplets having more uniform size distributions, there are numerous problems with this approach. For example, the long term photostability of photopolymerized systems is a concern due to the presence of photoinitiators that produce reactive free radicals. Photoinitiators not consumed by the polymerization process can continue to produce free radicals that can degrade the polymer and liquid crystals over time. Furthermore, it is also known that UV radiation is harmful to liquid crystals. Specifically, exposure to UV radiation can lead to decomposition of the chiral dopant in a cholesteric liquid crystal mixture, resulting in a change in the reflected color. The use of organic solvents may also be objectionable in certain manufacturing environments.

U.S. Pat. Nos. 6,423,368 and 6,704,073 propose to overcome the problems associated with the prior art methods through the use of droplets of the liquid crystal material prepared using a limited coalescence process. In this process, the droplet-water interface is stabilized by particulate species, such as colloidal silica. Surface stabilization by particulate species such as colloidal silica is particularly preferred as it can give narrow size distribution and the size of the droplets can be controlled by the concentration of the particulate species employed. The materials prepared via this process are also referred to as Pickering Emulsions and are described more fully by Whitesides and Ross (J. Colloid Interface Sci. 169, 48 (1995)). The uniform droplets may be combined with a suitable binder and coated on a conductive surface to prepare a device. The process provides improvement in brightness and contrast over prior art processes. It also overcomes some of the problems associated with photoinitiators and UV radiation. However, there is still much room for improvement, particularly in terms of the switching voltage or the voltage needed to change the orientation of the liquid crystal from one state to another. The latter has a significant effect on the overall cost of the display. A low switching voltage is extremely desirable for low cost displays.

The device described by U.S. Pat. Nos. 6,423,368 and 6,704,073 suffers from drawbacks because of the structure of the coated layer. Undesirably, there may be more than a monolayer of droplets between the two electrodes. Furthermore, the process of coating a heated emulsion of the liquid crystal in a gelatin binder onto a substrate with a conductive layer and subsequently lowering the temperature of the coating to change the state of the coated layer from a free flowing liquid to a gel state, referred to as a sol-gel transition, prior to drying the coating results in an extremely uneven distribution of droplets of liquid crystal. At the microscopic scale there are regions of the coating containing overlapping droplets and other regions with no droplets at all between the electrodes. The uneven distribution of droplets results in a decrease in contrast and an increase in switching voltage.

U.S. Pat. Nos. 6,271,898 and 5,835,174 also describe compositions suitable for flexible display applications that employ very uniform sized droplets of liquid crystal in a polymer binder. However, no attempt is made to control the thickness or the distribution of droplets in the coated layer resulting in less than optimum performance.

U.S. patent application Ser. No. 10/718,900 shows that the maximum contrast in a bistable chiral nematic liquid crystal display prepared by the limited coalescence method is obtained when the uniform liquid crystal domains or droplets are coated as substantially a monolayer on the first conductive support. The bistable states in these chiral nematic liquid crystal displays are the planar reflecting state and the weakly scattering focal conic state. Back-scattering of light from the weakly scattering focal conic state increases drastically when there is more than a monolayer of droplets between the conductive surfaces. While the method provides displays with an improvement in brightness and contrast, it still falls short of optimum performance because the gelatin binder is made to undergo a sol-gel transition prior to drying of the coating resulting in an uneven structure.

Rudhardt et al. (Applied Physics Letters vol. 82, page 2610, 2003) describe a method of fabricating a light modulating device wherein a composition containing very uniform droplets of liquid crystal in an aqueous solution of polymer binder is spread on an indium tin oxide (ITO) coated glass surface and the water allowed to evaporate. The droplets of liquid crystal spontaneously self-assemble into a hexagonal close-packed (HCP) monolayer. A second ITO coated glass surface is placed over the coated layer of droplets as the top electrode to complete construction of the device. A uniform monolayer thickness is achieved for the coated layer and the close-packed distribution of droplets is also extremely well defined. Both features result in a low switching voltage. However, there are numerous problems with this approach. Firstly, the uniform droplets of liquid crystal are prepared by extrusion through a thin capillary into a flowing fluid. When a droplet at the tip of the capillary grows to reach critical size, viscous drag exceeds surface tension and breakoff occurs, producing highly monodisperse emulsions. Clearly, this method of creating one droplet at a time is not suitable for large scale manufacture. Secondly, the method by which the second, that is, top, electrode is applied may be suitable for construction of small scale displays on rigid substrates such as glass but is not viable for large area low cost displays on flexible substrates.

US 2003/0137717A1 and US 2004/0217929A1 indicate that a close-packed monolayer of droplets of the light modulating component may be desirable for obtaining high brightness and contrast in a polymer dispersed electrophoretic display. However the method of making droplets described in these applications is a standard emulsification process that does not result in emulsions having a narrow size distribution that is desirable for obtaining close-packed monolayers by spontaneous self-assembly. The preferred method of preparing droplets in US 2003/0137717A1 and US 2004/0217929A1 also involves encapsulation resulting in droplets or capsules in the size range of 20 to 200 microns with wall thickness of 0.2 to 10 microns. The relatively large droplet size and wall thickness result in high switching voltages. The latter is particularly a problem for bistable CLC devices. Encapsulation is clearly not desirable but these applications do not teach how a second conducting layer is to be applied on top of the coated layer of droplets in the absence of encapsulation. In the absence of encapsulation, droplets of the light modulating component may directly come in contact with the organic solvent in the screen printed conducting ink leading to contamination or poisoning of the light modulating component. This is particularly a concern if the light modulating component is a liquid crystal material.

To overcome the difficulties of US 2003/0137717A1 and US 2004/0217929A1, US 2004/0226820A1 teaches that a close-packed monolayer of droplets may be obtained by using electro-deposition followed by washing after the droplets have been spread on a suitable surface using a coating knife or coating head such as a slot die coating head. However, the additional steps of electro-deposition and washing are cumbersome and not suitable for manufacturing on a large scale. Even with these additional steps, a close-packed monolayer of uniform thickness is not achieved. The root mean square (RMS) surface roughness is about 6 microns because of non-uniform droplets or capsules. This is a very high value of surface roughness that would result in irregular or incomplete curing if a UV curable screen printed conducive ink is used as the second electrode. The irregular curing will result in increased switching voltages. Furthermore, a surface roughness of this magnitude will also result in significant non-uniformity of switching voltage across the area of the display since the switching voltage is directly related to the thickness of the coated layer.

US 2003/0137717A1, US 2004/0217929A1 and US 2004/0226820A1 also teach using polymer latex as the preferred binder. The use of polymer latex is not desirable for a number of reasons. Many commercial latex materials contain high boiling organic co-solvents that render them unsuitable for use in PDLC films due to the poisoning effect the solvents have on the liquid crystal or other light modulating component. This is particularly true if the droplets are not encapsulated as is desirable from the point of view of reduced switching voltage. Latex polymers also have an affinity for the liquid crystal or other light modulating component leading to dissolution of the light modulating component into the polymer matrix. Furthermore, if the latex is not fully transparent, it can lead to a loss of contrast. Other binders suggested in US 2004/0217929A1 such as acrylics or polyvinylalcohol are difficult to fix or cross-link if used alone. Fixing or cross-linking is desired in order to preserve the close-packed monolayer structure when other layers are spread over it.

U.S. patent application Ser. No. 11/017,181 describes a novel method for polymer dispersed liquid crystal that overcomes the problems of the prior art. A uniform dispersion of liquid crystal droplets is prepared by the limited coalescence process. The droplets are mixed with a suitable binder and coated and dried on a flexible conductive support at a temperature above the sol-gel transition of the binder. The uniform droplets of liquid crystal spontaneously self-assemble to create a close-packed monolayer. The desired close-packed structure is then fixed or preserved by cross-linking the binder. Subsequently, a second aqueous layer containing gelatin is coated above the liquid crystal layer and allowed to dry at a temperature that is below the sol-gel transition of the binder. This second layer protects the liquid crystal material from the solvent in the conductive ink. A conductive ink is screen printed over this layer to complete construction of the device. The device may be manufactured using a low-cost process. Furthermore, it exhibits low switching voltage as well as good contrast and brightness. However, there is still room for further reductions in switching voltage.

To create a device with low switching voltage, it is important to minimize the voltage drop across the second aqueous layer or barrier layer. While it is possible to do this by using conductive materials such as dispersed carbon black, use of such isotropic conductors results in undesirable field spreading. In a matrix display with multiple rows and columns, it is important to activate only the desired pixel and not adjacent pixels. To enable this, it is essential to avoid electrical conduction in the x-y plane, that is, parallel to the electrodes, in the barrier layer but have significant electrical conduction in the z-direction, that is, perpendicular to the electrodes.

An alternative approach is clearly needed that improves upon the device architecture of U.S. patent application Ser. No. 11/017,181 to achieve low switching voltages.

PROBLEM TO BE SOLVED

There remains a need for a reduced cost, display having excellent brightness, high contrast, and low switching voltage.

SUMMARY OF THE INVENTION

The present invention relates to a high contrast reflective display comprising a substrate, at least one electronically modulated imaging layer, wherein the electronically modulated imaging layer comprises a uniformly thick, close-packed, ordered monolayer of domains of electrically modulated material in a fixed polymer matrix, at least one barrier layer, wherein the barrier layer is conductive in a direction perpendicular to the substrate, and at least one electrically conductive layer. The invention also relates to a method of making a high contrast reflective display comprising: providing a substrate; applying a first conductive layer; applying at least one layer of domains of electrically modulated material in a polymer matrix; drying the at least one applied layer of domains of electrically modulated material in a polymer matrix at a temperature above the chill set temperature or sol-gel transition temperature of the polymer matrix to permit self-assembly of the domains of electrically modulated material into a close-packed monolayer of domains of electrically modulated material; and fixing the polymer matrix to preserve the close-packed monolayer of domains of electrically modulated material; applying a barrier layer comprising anisotropic particles; orienting the anisotropic conductor to produce a barrier layer conductive in a direction perpendicular to the substrate; and applying a second conductive layer, as well as a method of making a high contrast reflective display comprising: providing a substrate; applying a conductive layer; applying at least one layer of domains of electrically modulated material in a polymer matrix; drying the at least one applied layer of domains of electrically modulated material in a polymer matrix at a temperature above the chill set temperature or sol-gel transition temperature of the polymer matrix to permit self-assembly of domains of electrically modulated material into a close-packed monolayer of domains of electrically modulated material; and fixing the polymer matrix to preserve the close-packed monolayer of domains of electrically modulated material; applying a barrier layer comprising anisotropic particles; and orienting said anisotropic particles to produce a barrier layer conductive in a direction perpendicular to the substrate.

ADVANTAGEOUS EFFECT OF THE INVENTION

The present invention includes several advantages, not all of which are incorporated in a single embodiment. The high driving voltage of cholesteric polymer dispersed liquid crystal (PDLC) displays results in high driver cost and increased power consumption. A display according to the present invention would be low cost and require low switching voltage. In the case of a cholesteric or chiral nematic liquid crystal display, the resulting display is expected to have reflectance closer to the theoretical limit of 50% and higher contrast.

BRIEF DESCRIPTION OF THE DRAWINGS

FIG. 1 illustrates the structure of basic carbon nanotubes.

FIG. 2 illustrates structures of functionalized carbon nanotubes.

FIG. 3 illustrates the alignment of carbon nanotubes in the barrier layer prior to chill setting and drying.

FIG. 4 illustrates a barrier layer with anisotropic conducting particles oriented in the z-direction as a result of growing the conductive particles in the z-direction to induce the preferred orientation.

FIG. 5 illustrates a schematic of liquid crystal display device.

DETAILED DESCRIPTION OF THE INVENTION

Figure 6:
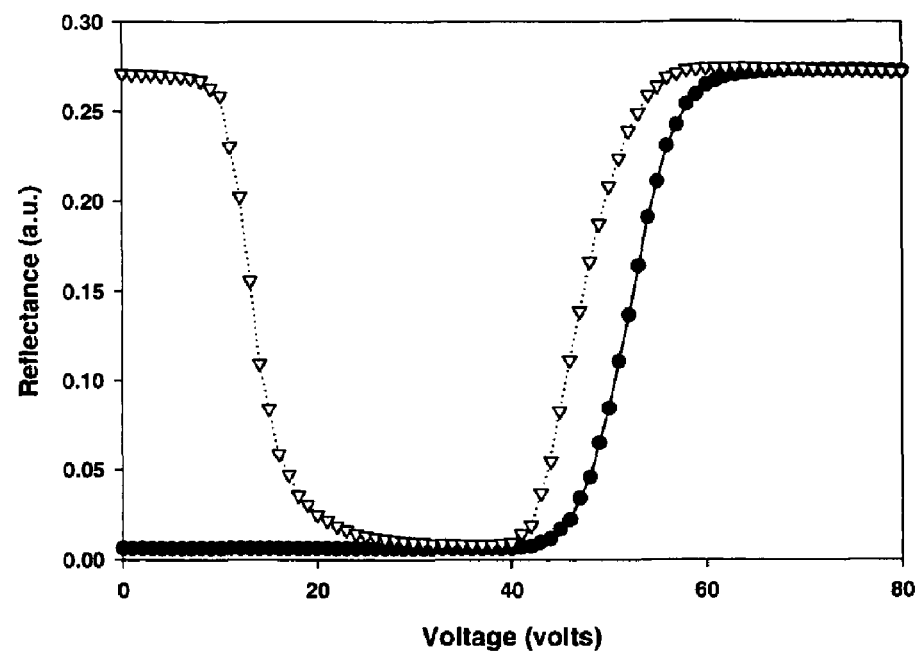
FIG. 6 illustrates the electro-optic response of a control device.

The present invention relates to a high contrast reflective display comprising at least one substrate, at least one electrically conductive layer, a solvent barrier layer, which is conductive in a direction perpendicular to the conductive layer, and at least one uniformly thick, close-packed, ordered monolayer of domains of electrically modulated material in a fixed polymer matrix and a method of making the same. In the preferred embodiment, the electrically modulated material is a chiral nematic liquid crystal incorporated in a polymer matrix.

Chiral nematic liquid crystalline materials may be used to create electronic displays that are both bistable and viewable under ambient lighting. Furthermore, the liquid crystalline materials may be dispersed as micron sized droplets in an aqueous medium, mixed with a suitable binder material and coated on a flexible conductive support to create potentially low cost displays. The operation of these displays is dependent on the contrast between the planar reflecting state and the weakly scattering focal conic state.

In order to derive the maximum contrast from these displays, it is desired that the chiral nematic liquid crystal domains or droplets are spread on a conductive support as a close-packed ordered monolayer. It is possible to prepare such an ordered monolayer by first applying an aqueous dispersion of chiral nematic liquid crystal domains to the substrate in the presence of a suitable binder, allowing the domains or droplets to self-assemble into a close-packed ordered monolayer, preferably a hexagonal close-packed (HCP) monolayer and then allowing the binder material to set, become fixed, or crosslink to preserve the close-packed ordered monolayer structure so that other aqueous layers can be spread above the imaging layer without affecting the close-packed structure.

By combining the single-substrate close packed monolayer (HCP monolayer) structure for PDLC and low switching voltage chiral liquid crystal material with an overcoat that has barrier properties to organic solvents and monomers typically used in printed conductive inks and a high concentration of conducting, preferably oriented, particles, the invention provides a method for single substrate cholesteric PDLC that achieves probably the lowest driving voltage known to date. The preferred conducting particles are most preferably anisotropic particles. For purposes of the present invention, an anisotropic particle is a particle with physical properties that are different in different directions, here, an aspect ratio greater than 5 where aspect ratio refers to the ratio of the longest dimension to the shortest dimension of a particle. When referring to a plurality of particles having a defined aspect ratio, what is meant is that all of the particles of a composition as a whole have an average aspect ratio as defined.

In general, the light modulating imaging layer contains electrically modulated material domains dispersed in a binder. For purposes of the present invention domains are defined to be synonymous with micelles and/or droplets. The electrically modulated material may be electrochromic material, rotatable microencapsulated microspheres, liquid crystal materials, cholesteric/chiral nematic liquid crystal materials, polymer dispersed liquid crystals (PDLC), polymer stabilized liquid crystals, surface stabilized liquid crystals, smectic liquid crystals, ferroelectric material, electroluminescent material or any other of a very large number of light modulating imaging materials known in the prior art. The domains of the electrically modulated imaging layer include droplets having uniform domain size, with few, if any, parasitic domains, which are domains with random or uncontrolled sizes and which have undesirable electro-optical properties, within the dried coatings, as described in previous patent art.

The display includes a suitable electrically modulated material disposed on a suitable support structure, such as on or between one or more electrodes. The term "electrically modulated material" as used herein is intended to include any suitable nonvolatile material. Suitable materials for the electrically modulated material are described in U.S. patent application Ser. No. 09/393,553 and U.S. Provisional Patent Application Ser. No. 60/099,888, the contents of both applications are herein incorporated by reference.

The electrically modulated material may also be an arrangement of particles or microscopic containers or microcapsules. Each microcapsule contains an electrophoretic composition of a fluid, such as a dielectric or emulsion fluid, and a suspension of colored or charged particles or colloidal material. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon materials are disclosed in U.S. Pat. Nos. 6,147,791, 4,126,854 and 6,055,091, the contents of which are herein incorporated by reference.

According to one practice, the microcapsules may be filled with electrically charged white particles in a black or colored dye. Examples of electrically modulated material suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material.

Further, the electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through.

The electrically modulated material may also include surface stabilized ferrroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of nonelectrically modulated material based materials that have the previously listed radiation absorbing or emitting characteristics. The electrically modulated material employed in connection with the present invention preferably has the characteristic that it does not require power to maintain display of indicia.

The most preferred electrically modulated material is a light modulating material, such as a liquid crystalline material. The liquid crystalline material can be one of many different liquid crystal phases such as; nematic (N), chiral nematic (N*), or smectic, depending upon the arrangement of the molecules in the mesophase. Chiral nematic liquid crystal (N*LC) displays are preferably reflective, that is, no backlight is needed, and can function without the use of polarizing films or a color filter.

Chiral nematic liquid crystal refers to the type of liquid crystal having finer pitch than that of twisted nematic and super twisted nematic used in commonly encountered liquid crystal devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field, the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference. Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory.

Modern chiral nematic liquid crystal materials usually include at least one nematic host combined with a chiral dopant. In general, the nematic liquid crystal phase is composed of one or more mesogenic components combined to provide useful composite properties. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenyl cyclohexanes, cyclohexyibiphenyls, phenyl cyclohexylcyclohexanes, cyclohexylcyclohexanes, cyclohexylcyclohexenes, cyclohexylcyclohexylcyclohexenes, 1,4-bis-cyclohexylbenzenes, 4,4-bis-cyclohexylbiphenyls, phenyl- or cyclohexylpyrimidines, phenyl- or cyclohexylpyridines, phenyl- or cyclohexylpyridazines, phenyl- or cyclohexyidioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl) ethanes, 1-cyclohexyl-2',2-biphenylethanes, 1-phenyl-2-cyclohexylphenylethanes, optionally halogenated stilbenes, benzyl phenyl ethers, tolanes, substituted cinnamic acids and esters, and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y-Z-R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc-, wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl) ethyl, pyrimidine-2,5-diyl, pyridine-2,5-diyl or 1,3-dioxane-2,5-diyl. Y in these compounds is selected from the following bivalent groups —CH═CH—, —C≡C—, —N═N(O)—, —CH═CY'—, —CH═N(O)—, —CH2—CH2—, —CO—O—, —CH2—O—, —CO—S—, —CH2—S—, —COO-Phe-COO— or a single bond, with Y' being halogen, preferably chlorine, or —CN, R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in light modulating liquid crystal compositions. Chiral nematic liquid crystal materials and cells, as well as polymer stabilized chiral nematic liquid crystals and cells, are well known in the art and described in, for example, U.S. patent application Ser. Nos. 07/969,093, 08/057,662, Yang et al., Appl. Phys. Lett. 60(25) pp 3102-04 (1992), Yang et al., J. Appl. Phys. 76(2) pp 1331 (1994), published International Patent Application Ser. No. PCT/US92/09367, and published International Patent Application Ser. No. PCT/US92/03504, all of which are incorporated herein by reference.

Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, T203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: for example, G. Gottarelli and G. Spada, *Mol. Cryst. Liq. Crys.*, 123, 377 (1985), G. Spada and G. Proni, *Enantiomer*, 3, 301 (1998) and references therein. Typical well known dopant classes include 1,1-binaphthol derivatives, isosorbide and similar isomannide esters as disclosed in U.S. Pat. No. 6,217,792, TADDOL derivatives as disclosed in U.S. Pat. No. 6,099,751, and the pending spiroindanes esters as disclosed in U.S. patent application Ser. No. 10/651,692 by T. Welter et al., filed Aug. 29, 2003, titled "Chiral Compounds And Compositions Containing The Same," hereby incorporated by reference.

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983, incorporated herein by reference. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP.c)$$

where c is the concentration of the chiral dopant and HTP is the proportionality constant.

For some applications, it is desired to have liquid crystal mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

The liquid crystalline droplets or domains are typically dispersed in a continuous binder. In one embodiment, a chiral nematic liquid crystal composition may be dispersed in a continuous polymeric matrix. Such materials are referred to as "polymer dispersed liquid crystal" materials or "PDLC" materials. Suitable hydrophilic binders include both naturally occurring substances such as proteins, protein derivatives, cellulose derivatives, for example, cellulose esters, gelatins and gelatin derivatives, polysaccaharides, casein, and the like, and synthetic water permeable colloids such as poly(vinyl lactams), acrylamide polymers, latex, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

Gelatin is derived from a material called collagen. Collagen has a high content of glycine and of the imino acids proline and hydroxyproline. It has a triple helix structure made up of three parallel chains. When collagen in water is heated above a certain temperature, it will denature to form gelatin. Concentrated gelatin solutions form rigid gels when cooled. This phenomenon is known as sol-gel transition or thermal gelation and is the result of secondary bonding, such as hydrogen bonding, between gelatin molecules in solution. It should be noted that this property is not limited to gelatin; for example, aqueous solutions of agar, a polysaccharide from seaweed, will also form rigid gels upon cooling. Partial renaturation of gelatin also occurs upon cooling. The latter refers to the formation of triple helix collagen-like structures. The structures do not form if gelatin is not chill set prior to drying. In other words, molecules of gelatin remain in a random coil configuration if the coating is dried at a temperature that is above the sol-gel transition temperature. The presence of helix structures may be detected by x-ray diffraction. Chill set gelatin containing molecules in a helix configuration has relatively low solubility in cold water and organic solvents compared to the random coil gelatin. This property enables chill set gelatin to be an effective barrier between the organic solvent in printed conductive inks and the light modulating material, thereby protecting the light modulating material from subsequently applied layers.

Useful "gelatins," as that term is used generically herein, include alkali treated gelatin, for example, cattle bone or hide gelatin, acid treated gelatin, for example, pigskin gelatin, fish skin gelatin and gelatin derivatives such as acetylated gelatin, and phthalated gelatin. Any type of gelatin may be used, provided the gelatin has sufficient molecular weight to allow the crosslinker to crosslink or the fixative to fix or set. Fish gelatins have lower imino acid content compared to mammalian gelatins. The sol-gel transition temperature or thermal gelation temperature or chill set temperature is lower if the imino acid content is smaller. For example, the chill set temperature of gelatins derived from deep water fish such as cod, haddock or pollock is significantly lower than that of cattle gelatin. Aqueous solutions of these gelatins remain fluid until about 10° C. whereas solutions of cattle gelatin will gel at room temperature. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water soluble polyvinyl compounds such as polyvinyl alcohol, polyacrylamide, poly(vinylpyrrolidone), and the like. Useful liquid crystal to gelatin ratios should be between 6:1 and 0.5:1 liquid crystal to gelatin, preferably 3:1.

Other organic binders such as polyvinyl alcohol (PVA) or polyethylene oxide (PEO) can be used as minor components of the binder in addition to gelatin. Such compounds are preferably machine coatable on equipment associated with photographic films.

It is desirable that the binder has a low ionic content. The presence of ions in such a binder hinders the development of an electrical field across the dispersed liquid crystal material. Additionally, ions in the binder can migrate in the presence of an electrical field, chemically damaging the light modulating layer. The coating thickness, size of the liquid crystal domains, and concentration of the domains of liquid crystal materials are designed for optimum optical properties. Heretofore, the dispersion of liquid crystals is performed using shear mills or other mechanical separating means to form domains of liquid crystal within light modulating layer.

A conventional surfactant can be added to the emulsion to improve coating of the layer. Surfactants can be of conventional design, and are provided at a concentration that corresponds to the critical micelle concentration (CMC) of the solution. A preferred surfactant is Aerosol OT, commercially available from Cytec Industries, Inc.

In a preferred embodiment, the liquid crystal and gelatin emulsion are coated and dried to optimize the optical properties of the light modulating layer. In one embodiment, the layer is coated to provide a final coating containing a substantial monolayer of N*LC domains. The term "substantial monolayer" is defined by the Applicants to mean that, in a direction perpendicular to the plane of the display, there is no more than a single layer of domains sandwiched between the electrodes over 90% of the area of the display or the imaging layer.

The amount of material needed for a monolayer can be determined by calculation based on individual domain size. Furthermore, improved viewing angle and broadband features may be obtained by appropriate choice of differently doped domains based on the geometry of the coated droplet and the Bragg reflection condition.

The addition of a bacteriostat prevents gelatin degradation during emulsion storage and during material operation. The gelatin concentration in the emulsion when coated is preferably between about 2 and 20 weight percent based on the weight of the emulsion. In the final emulsion, the liquid crystal material may be dispersed at 15% concentration in a 5% gelatin aqueous solution.

A crosslinking agent or hardener may be used to preserve the architecture of the close-packed monolayer of coated droplets after it has been formed by self-assembly. Other methods of fixing the architecture of the close-packed monolayer of domains may also be used, although crosslinking is preferred. The effects of the crosslinker may be characterized based on the reaction of certain amino acid residues in gelatin. For example, the amount of histadine is typically reduced from about 4 residues per 1000 to less than 2.5 residues per 1000 upon cross-linking. Also the amount of hydroxylysine is reduced from about 6.9 residues per 1000 to less than 5.1 residues per 1000. Many conventional hardeners are known to crosslink gelatin. Gelatin crosslinking agents, that is, the hardener, are included in an amount of at least about 0.01 wt. % and preferably from about 0.1 to about 10 wt. % based on the weight of the solid dried gelatin material used. By dried gelatin it is meant substantially dry gelatin at ambient conditions as for example obtained from Eastman Gel Co., as compared to swollen gelatin. More preferably, hardener is present in the amount of from about 1 to about 5 percent by weight. More than one gelatin crosslinking agent can be used if desired. Suitable hardeners may include inorganic, organic hardeners, such as aldehyde hardeners and olefinic hardeners. Inorganic hardeners include compounds such as aluminum salts, especially the sulfate, potassium and ammonium alums, ammonium zirconium carbonate, chromium salts such as chromium sulfate and chromium alum, and salts of titanium dioxide, and zirconium dioxide. Representative organic hardeners or gelatin crosslinking agents may include aldehyde and related compounds, pyridiniums, olefins, carbodiimides, and epoxides. Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2(1H)-pyrimidinone polymers (Sequa SUNREZ® 700), polymers of the type having a glyoxal polyol reaction product consisting of 1 anhydroglucose unit: 2 glyoxal units (SEQUAREZ® 755 obtained from Sequa Chemicals, Inc.), DME-Melamine non-formaldehyde resins such as Sequa CPD3046-76 obtained from Sequa Chemicals Inc., and 2,3-dihydroxy-1,4-dioxane (DHD). Thus, hardeners that contain active olefinic functional groups include, for example, bis-(vinylsulfonyl)-methane (BVSM), bis-(vinylsulfonyl-methyl) ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups. See The Theory of the Photographic Process, 4th Edition, T. H. James, 1977, Macmillan Publishing Co., page 82, incorporated herein by reference. Other examples of hardening agents can be found in standard references such as The Theory of the Photographic Process, T. H. James, Macmillan Publishing Co., Inc. (New York 1977) or in Research Disclosure, September 1996, Vol. 389, Part IIB (Hardeners) or in Research Disclosure, September 1994, Vol. 365, Item 36544, Part IIB (Hardeners), all incorporated herein by reference. Research Disclosure is published by Kenneth Mason Publications, Ltd., Dudley House, 12 North St., Emsworth, Hampshire P001 7DQ, England. Olefinic hardeners are most preferred, as disclosed in U.S. Pat. Nos. 3,689,274, 2,994,611, 3,642,486, 3,490,911, 3,635,718, 3,640,720, 2,992,109, 3,232,763, and 3,360,372, all incorporated herein by reference.

Among hardeners of the active olefin type, a preferred class of hardeners particularly are compounds comprising two or more vinyl sulfonyl groups. These compounds are hereinafter referred to as "vinyl sulfones". Compounds of this type are described in numerous patents including, for example, U.S. Pat. Nos. 3,490,911, 3,642,486, 3,841,872 and 4,171,976, all incorporated herein by reference. Vinyl sulfone hardeners are believed to be effective as hardeners as a result of their ability to crosslink polymers making up the colloid.

The liquid crystalline droplets or domains may be formed by any method, known to those of skill in the art, which will allow control of the domain size. For example, Doane et al. (*Applied Physics Letters*, 48, 269 (1986), incorporated herein by reference) disclose a PDLC comprising approximately 0.4 µm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993), incorporated herein by reference) disclose a PDLC comprising a chiral nematic mixture in a polymer binder. Once again a phase separation method is used for preparing the PDLC. The liquid crystal material and polymer, for example, a hydroxy functionalized polymethylmethacrylate, along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

In a preferred embodiment, a method referred to as "limited coalescence" is used to form uniformly sized emulsions of liquid crystalline material. For example, the liquid crystal material can be homogenized in the presence of finely divided silica, a coalescence limiting material, such as LUDOX® from DuPont Corporation. A promoter material can be added to the aqueous bath to drive the colloidal particles to the liquid-liquid interface. In a preferred embodiment, a copolymer of adipic acid and 2-(methylamino)ethanol can be used as the promoting agent in the water bath. The liquid crystal material can be dispersed using ultrasound to create liquid crystal domains below 1 micron in size. When the ultrasound energy is removed, the liquid crystal material coalesces into domains of uniform size. The limited coalescence process is described more fully by Whitesides and Ross (J. Colloid Interface Sci. 169, 48 (1995)), by Giermanska-Kahn, Schmitt, Binks and Leal-Calderon (Langmuir, 18, 2515 (2002)), and U.S. Pat. No. 6,556,262, all incorporated herein by reference.

The distribution of droplet sizes is such that the coefficient of variation (cv) defined as the standard deviation of the distribution divided by the arithmetic mean is less than 0.25, preferably less than 0.2 and most preferably less than 0.15. The limited coalescent materials can be coated using a photographic emulsion coating machine onto sheets of polyester having an ITO coating with a sheet conductivity of 300 ohms per square. The coating can be dried to provide a polymerically dispersed cholesteric coating. By using limited coalescence, there are few, if any, parasitic smaller domains having undesirable electro-optical properties within the dried coatings.

The size ranges of domains in the dried coating are varied as the mixture dries and the domains flatten. In one embodiment, the resulting domains are flattened by the drying process and have on average a thickness substantially less than their length. The flattening of the domains can be achieved by proper formulation and sufficiently rapid drying of the coating.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried. Most preferably the imaging layer or light modulating layer has a thickness between 2 to 6 microns, particularly if the light modulating material is a chiral nematic liquid crystal.

The flattened domains of liquid crystal material can be defined as having a major axis and a minor axis. In a preferred embodiment of a display or display sheet, the major axis is larger in size than the cell or imaging layer thickness for a majority of the domains. Such a dimensional relationship is shown in U.S. Pat. No. 6,061,107, hereby incorporated by reference in its entirety.

In U.S. Pat. No. 3,600,060, incorporated herein by reference, the domains of the dried light modulating material had particle size varying in diameter by a ratio of 10:1. This creates large domains and smaller parasitic domains. Parasitic domains have reduced characteristics when compared with optimized larger domains. The reduced characteristics include reduced brightness and if the parasitic domains are small enough diminished bistability of the cholesteric liquid crystal. The dispersed domains have an average diameter of 2 to 30 microns, preferably 5 to 15 microns. The domains are dispersed in an aqueous suspension. The size ranges for the dried coating are varied as the mixture dries and the domains flatten.

By varying the amount of silica and copolymer relative to the liquid crystalline material, uniform domain size emulsions of the desired average diameter by microscopy, can be produced. This process produces domains of a selected average diameter. The resulting domains are flattened by the drying process and have on average a thickness substantially less than their length, preferably at least 50% less. More preferably, the domains on average have a thickness (depth) to length ratio of 1:2 to 1:10.

For optimal performance one requires a monolayer of coated droplets having a close-packed structure of uniform thickness. Calculations by Yang and Mi (J. Phys. D: Appl. Phys. Vol. 33, page 672, 2000, incorporated herein by reference) have shown that for a chiral nematic liquid crystalline material of a given handedness, maximum reflectance is obtained if the thickness of the chiral nematic liquid crystal material between the electrodes is about ten times the pitch of the chiral nematic helix. For a green reflecting chiral nematic liquid crystal material with $\lambda_{max}$ of 550 nm and $n_{av}$ of 1.6 the pitch is 344 nm. Therefore, maximum reflectance is obtained for a 3.4 µm thick layer of this material. For chiral nematic liquid crystal materials that reflect in the red and near infrared portions of the spectrum, the pitch and therefore the thickness of the coated layer needed for maximum reflectance will be somewhat higher but even in these cases a thickness of about 5 µm is sufficient, if the refractive index is close to 1.6. In other words, increasing the thickness of the layer beyond this does not provide an increase in reflectance.

It is also well documented that the switching voltage increases linearly with thickness. Since it is desirable to have the lowest possible switching voltage, a uniform thickness of about 5 µm is most preferred for the coated layer of droplets, provided the droplets have a close-packed structure. Under certain conditions, monodisperse droplets of the light modulating material will spontaneously self-assemble on a surface into a hexagonal close-packed (HCP) structure. The process has been described in detail by Denkov et al. (Nature, vol. 361, p. 26, 1993, incorporated herein by reference). When an aqueous suspension of droplets is spread on a surface, the droplets initially assume a random, disordered or uncorrelated distribution. However, as a function of drying, when the level of water reaches the top of the droplets, there is a strong attractive force known as the capillary force that drives the droplets into a close-packed ordered or correlated structure. The attractive energy of the capillary force is much greater than the thermal energy. However, it is important that lateral movement of droplets is not impeded by a strong attraction to the surface or by an increase in viscosity of the medium in which they are suspended. The latter would happen if the binder is gelatin and the coated layer of droplets is chill set prior to drying.

The formation of a close-packed structure in two dimensions, starting from a random distribution of droplets, is sometimes referred to as two-dimensional crystallization and should have a monodisperse population of droplets or a population of droplets having low polydispersity (Kumacheva et al. Physical Review Letters vol. 91, page 1283010-1, 2003, incorporated herein by reference). A population of droplets of light modulating material having sufficiently low polydispersity to create a close-packed structure may be achieved by the limited coalescence process. The close-packed structure is readily observable under an optical microscope. Furthermore, the close-packed structure has a repeat pattern or periodicity wherein the repeat distance is of the order of the wavelength of visible light. A coating having such a pattern exhibits Fraunhofer diffraction when placed before a source of visible light such as a visible light laser. The phenomenon of Fraunhofer diffraction is described more fully by Lisensky et al. (Journal of Chemical Education, vol. 68, February 1991, incorporated herein by reference).

For perfectly monodisperse droplets, for example, with a cv less than 0.1, a hexagonal close-packed (HCP) structure is obtained. The diffraction pattern for such a structure is in the form of spots. If there is a minor level of polydispersity, for example, cv between 0.1 and 0.2, the diffraction pattern of the close-packed structure is in the form of a single ring or a set of concentric rings.

The close-packed monolayer structure of coated droplets may be preserved by fixing or crosslinking the binder. This allows a second aqueous layer to be coated above the layer containing the light modulating material without disturbing the close-packed organization. In a preferred embodiment, the second layer functions as a protective overcoat for the light modulating material.

In addition to binder and hardener, liquid crystal layers may also contain a small amount of light absorbing colorant, preferably an absorber dye. It is preferred that an absorbing dye is used to selectively absorb back scattered light from the focal conic state at the lowest wavelengths in the visible part of the spectrum. Further, the colorant selectively absorbs similarly scattered light from the planar state, while only minimally absorbing the main body of reflected light. The colorants may include both dyes and pigments. The colorant may absorb light components, which may cause turbidity of color in the color display performed by selective reflection of the liquid crystal or may cause lowering of a transparency in the transparent state of the liquid crystal, and therefore can improve the display quality. Two or more of the components in the liquid crystal display may contain a coloring agent. For example, both the polymer and the liquid crystal may contain the coloring agent. Preferably, a colorant is selected, which absorbs rays in a range of shorter wavelengths than the selective reflection wavelength of the liquid crystal.

Any amount of colorant may be used, provided that addition of the colorant does not remarkably impair the switching characteristics of the liquid crystal material for display. In addition, if the polymeric binder is formed by polymerization, the addition does not inhibit the polymerization. An exemplary amount of colorant is from at least 0.1 weight % to 5 weight % of the liquid crystal material.

In a preferred embodiment, the colorants, preferably absorber dyes, are incorporated directly in the chiral nematic liquid crystal materials. Any colorants that are miscible with the cholesteric liquid crystal materials are useful for this purpose. Most preferred are colorants that are readily soluble in toluene. By readily soluble is meant a solubility greater than 1 gram per liter, more preferably greater than 10 grams per liter and most preferably greater than 100 grams per liter. Toluene soluble dyes most compatible with the cholesteric liquid crystal materials are anthraquinone dyes such as Sandoplast Blue 2B from Clariant Corporation, phthalocyanine dyes such as Savinyl Blue GLS from Clariant Corporation or Neozapon Blue 807 from BASF Corporation, methine dyes such as Sandoplast Yellow 3G from Clariant Corporation or metal complex dyes such as Neozapon Yellow 157, Neozapon Orange 251, Neozapon Green 975, Neozapon Blue 807 or Neozapon Red 365 from BASF Corporation. Other colorants are Neopen Blue 808, Neopen Yellow 075, Sudan Orange 220 or Sudan Blue 670 from BASF Corporation. Other types of colorants may include various kinds of dyestuff such as dyestuff for resin coloring and dichromatic dyestuff for liquid crystal display. The dyestuff for resin coloring may be SPR RED1 (manufactured by Mitsui Toatsu Senryo Co., Ltd.). The dichromatic dyestuff for liquid crystal is specifically SI-424 or M-483 (both manufactured by Mitsui Toatsu Senryo Co., Ltd.).

Another aspect of the present invention relates to a display sheet comprising a substrate, an electrically conductive layer formed over the substrate, and a liquid crystal containing imaging layer comprising a chiral nematic material formed by the above described methods disposed over the electrically conductive layer, which is, in turn, coated with a conductive barrier layer followed by a second conductive electrode layer or means.

As used herein, the phrase a "liquid crystal display" (LCD) is a type of flat panel display used in various electronic devices. At a minimum, a LCD comprises a substrate, at least one conductive layer and a liquid crystal layer. LCDs may also comprise two sheets of polarizing material with a liquid crystal solution between the polarizing sheets. The sheets of polarizing material may comprise a substrate of glass or transparent plastic. The LCD may also include functional layers. In one embodiment of a LCD, a transparent, multi-layer flexible support is coated with a first conductive layer, which may be patterned, onto which is coated the light modulating liquid crystal layer. A second conductive layer is applied and overcoated with a dielectric layer to which dielectric conductive row contacts are attached, including via holes that permit interconnection between conductive layers and the dielectric conductive row contacts. An optional nanopigmented functional layer may be applied between the liquid crystal layer and the second conductive layer.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, thus exhibiting different light reflecting characteristics according to its phase and/or state.

Cholesteric liquid crystals are bistable at zero field and drive schemes may be designed based on their response to voltage pulses. The displays may employ any suitable driving schemes and electronics known to those skilled in the art, including the following, all of which are incorporated herein by reference in their entireties: Doane, J. W., Yang, D. K., *Front—lit Flat Panel Display from Polymer Stabilized Cholesteric Textures,* Japan Display 92, Hiroshima October 1992; Yang, D. K. and Doane, J. W., *Cholesteric Liquid Crystal/Polymer Gel Dispersion: Reflective Display Application,* SID Technical Paper Digest, Vol XXIII, May 1992, p. 759, et sea.; U.S. patent application Ser. No. 08/390,068, filed Feb. 17, 1995, entitled "Dynamic Drive Method and Apparatus for a Bistable Liquid Crystal Display" and U.S. Pat. No. 5,453,863, all incorporated herein by reference.

A typical display in its simplest form comprises a sheet supporting a conventional polymer dispersed electrically modulated material. The sheet includes a substrate. Substrate can be made of a polymeric material, such as Kodak Estar film base formed of polyester plastic, and have a thickness of between 20 and 200 microns. For example, substrate can be an 80 micron thick sheet of transparent polyester. Other polymers, such as transparent polycarbonate, can also be used. Alternatively, substrate can be thin, transparent glass.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post manufacturing conditions such as in a process line of a displays manufacturer. Certain of the plastic substrates discussed below can withstand higher processing temperatures of up to at least about 200° C., some up to 300-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene) fluoropolymer (PETFE), and poly (methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan, Zeanor T made by Zeon Chemicals L.P., Tokyo Japan, and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains UV cured polyester acrylate and colloidal silica. When deposited on Arton, it has a surface composition of 35 atom % C, 45 atom % O, and 20 atom % Si, excluding hydrogen. Another particularly preferred hard coating is the acrylic coating sold under the trademark "Terrapin" by Tekra Corporation, New Berlin, Wis.

The LCD contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation, incorporated herein by reference. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.), incorporated herein by reference Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC sputtering or RF-DC sputtering, depending upon the material or materials of the underlying layer. The conductive layer may be a transparent, electrically conductive layer of tin oxide or indium tin oxide (ITO), or polythiophene (PDOT). Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

The light modulating material is coated over patterned ITO first conductors to provide a polymer dispersed cholesteric coating having a dried thickness of less than 50 microns, preferably less than 25 microns, more preferably less than 15 microns, most preferably less than about 10 microns.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO, which is polycrystalline. The ITO layer is preferably 10-120 nm in thickness, or 50-100 nm thick to achieve a resistivity of 20-60 ohms/square on plastic. An exemplary preferred ITO layer is 60-80 nm thick.

The conductive layer is preferably patterned. The conductive layer is preferably patterned into a plurality of electrodes. The patterned electrodes may be used to form a LCD device. In another embodiment, two conductive substrates are positioned facing each other and cholesteric liquid crystals are positioned there between to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

In the present invention, a first conductor is formed over a substrate, to be located between the substrate and the light modulating layer in the final configuration. The first conductor can be a transparent, electrically conductive layer of tin-oxide or indium-tin-oxide (ITO), with ITO being the preferred material. Typically, the first conductor is sputtered onto the substrate to a resistance of less than 250 ohms per square. Alternatively, the first conductor can be an opaque electrical conductor formed of metal such as copper, aluminum or nickel. If the first conductor is an opaque metal, the metal can be a metal oxide to create a light absorbing first conductor.

A second conductor may be applied to the surface of light modulating imaging layer on the side of the light modulating layer opposite the substrate and/or the first conductor. The second conductor should have sufficient conductivity to carry a field across light modulating imaging layer. The second conductor can be formed in a vacuum environment using materials such as aluminum, tin, silver, platinum, carbon, tungsten, molybdenum, or indium.

In a preferred embodiment of the invention, the display device or display sheet has simply a single imaging layer of liquid crystal material along a line perpendicular to the face of the display, preferably a single layer coated on a flexible substrate. Such a structure, as compared to vertically stacked imaging layers each between opposing substrates, is especially advantageous for monochrome shelf labels and the like. Structures having stacked imaging layers, however, are optional for providing additional advantages in some case.

In a typical matrix-addressable light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode can be formed over the electrode layers. For example, in U.S. Pat. No. 5,703,436 to Forrest et al., incorporated herein by reference, transparent indium tin oxide (ITO) is used as the Hole injecting electrode, and a Mg—Ag-ITO electrode layer is used for electron injection.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium tin oxide, resulting in the layer being transparent. Alternatively, the second conductive layer may be printed conductive ink.

For higher conductivities, the second conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned by irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

In a preferred embodiment, second conductors are printed conductive ink such as ELECTRODAG 423SS screen printable electrical conductive material from Acheson Corporation. Such printed materials are finely divided graphite particles in a thermoplastic resin. The second conductors are formed using printed inks to reduce display cost. The use of a flexible support for substrate layer, laser etched first conductors, machine coating polymer dispersed cholesteric layer, and printing second conductors permit the fabrication of very low cost memory displays. Small displays formed using these methods can be used as electronically rewritable transaction cards for inexpensive, limited rewrite applications.

A light absorbing second conductor may be positioned on the side opposing the incident light. In the fully evolved focal conic state the cholesteric liquid crystal is transparent, passing incident light, which is absorbed by second conductor to provide a black image. Progressive evolution to the focal conic state causes a viewer to see an initial bright reflected light that transitions to black as the cholesteric material changes from planar state to a fully evolved focal conic state. The transition to the light transmitting state is progressive, and varying the low voltage time permits variable levels of reflection. These variable levels can be mapped out to corresponding gray levels, and when the field is removed, light modulating layer maintains a given optical state indefinitely. The states are more fully discussed in U.S. Pat. No. 5,437,811, incorporated herein by reference.

In addition to a second conductive layer, other means may be used to produce a field capable of switching the state of the liquid crystal layer as described in, for example, U.S. Pat. Appl. Nos. 20010008582 A1, 20030227441 A1, 20010006389 A1, and U.S. Pat. Nos. 6,424,387, 6,269,225, and 6,104,448, all incorporated herein by reference.

The protective overcoat or barrier layer is coated between the liquid crystal layer and subsequently applied layers. The barrier layer preferably has barrier properties to organic solvents and monomers typically used in printed conductive inks, for example, butyl cellusolve or 2-butoxyethyl acetate, propylene glycol methyl ether acetate, propylene glycol propyl ether, ethylene glycol n-butyl ether, 1-methoxy-2-propanol acetate and carbitol acetate. Preferably, the barrier layer is located between the light modulating layer and a later-applied conductive layer. Preferably, the later-applied conductive layer is a screen-printed conductive ink. It comprises polymer in a helix configuration and may in addition contain dispersed conductive particles and pigment particles. In a preferred embodiment it may contain anisotropic conductive particles such as carbon nanotubes or metal nanowires.

In a preferred embodiment, the layer containing the conductive single walled carbon nanotubes is prepared by applying a mixture containing:

a) a single walled carbon nanotube according to Formula I;

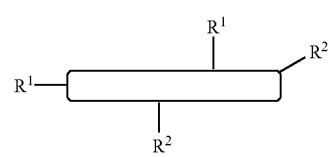

I wherein each of $R^1$ and $R^2$ independently represents carboxylic acid, carboxylate anion, such as a carboxylic acid salt, hydroxyl, sulfur containing groups, carbonyl, phosphates, and/or nitrates, and the tube is a single wall carbon nanotube composed of carbon atoms substantially in hexagonal configuration, and, a) dispersant and, b) a polymeric binder (I did not see a section on the binder used in the barrier layer).

The $R^1$ and $R^2$ substituents may be uniformly or non-uniformly distributed across the single walled carbon nanotube.

The carbon nanotubes suitable for use in the barrier layer of the invention may be formed by any known methods in the art, for example, laser ablation, chemical vapor deposition (CVD), arc discharge. The carbon nanotubes are preferred to have minimal or no impurities of carbonaceous impurities that are not carbon nanotubes, such as graphite, amorphous, diamond, non-tubular fullerenes, multiwall carbon nanotubes, or metal impurities. It is found that the conductivity increases significantly with reduced levels of metallic and carbonaceous impurities. Conductive layer film quality, as evidenced by layer uniformity, surface roughness, and a reduction in particulates, also improves with a decrease in the amount of metal and carbonaceous impurities.

To achieve high electronic conductivity, metallic single walled carbon nanotubes (SWCNTs) are the most preferred type of carbon nanotube but semimetallic and semiconducting single walled carbon nanotubes may also be used. A pristine single walled carbon nanotube means that the surface of the single walled carbon nanotube is free of covalently functionalized materials either through synthetic prep, acid cleanup of impurities, annealing or directed functionalization. For the purpose of the present invention, however, the single walled carbon nanotubes are preferably functionalized. The preferred functional group, referred to as X in FIG. 2, is a hydrophilic species selected from carboxylic acid, carboxylate anion, for example, carboxylic acid salt, hydroxyl, sulfur containing groups, carbonyl, phosphates, nitrates or combinations of these hydrophilic species. In some applications other types of functionalization such as polymer, small molecule or combinations thereof may be required. For example, such functionalization may improve the compatibility of the single walled carbon nanotube in a particular polymer matrix.

Turning now to FIG. 1, pristine single walled carbon nanotubes with either open or closed ends are illustrated. Single walled carbon nanotubes that are pristine are essentially intractable in most solvents, especially aqueous media, without the use of high levels of dispersants. Therefore, it is not possible to use only pristine single walled carbon nanotubes and water to produce an aqueous coating composition.

FIG. 2 exemplifies the basic structure of covalently functionalized single walled carbon nanotubes. The functional group X in FIG. 2 may be selected from one of the hydrophilic species listed above. It is worth noting that the functional group X may be positioned at any point on the single walled carbon nanotube, that is, on the external or internal surface, open or closed end, or sidewall. It is preferred that the functional group X be uniformly distributed across the external surface, potentially for the most effectiveness.

The most preferred covalent surface functionalization is carboxylic acid or a carboxylic acid salt or mixtures thereof, hereinafter referred to as only carboxylic acid. For carboxylic acid based functionalization, the preferred level of functionalized carbons on the single walled carbon nanotube is 0.5-100 atomic percent, where 1 atomic percent functionalized carbons would be 1 out of every 100 carbons in the single walled carbon nanotube have a functional group covalently attached. The functionalized carbons may exist anywhere on the nanotubes, for example, open or closed ends, external and internal sidewalls. As already mentioned, preferably the functionalization is on the external surface of the single walled carbon nanotubes. More preferably the functionalized percent range is 0.5-50 atomic percent or 0.5-10 atomic percent, and most preferably 0.5-5 atomic percent.

Additionally, a preferred embodiment for functionalization of this invention can preferably be where the functional group is a sulfur containing group selected from:

Where R is a carbon within the lattice of a single walled carbon nanotube, x may range from 1-3 and Z may be a Hydrogen atom or a metal cation such metals as Na, Mg, K, Ca, Zn, Mn, Ag, Au, Pd, Pt, Fe, Co and y may range from 0-1 or combinations these hydrophilic species. The sulfur containing groups listed above may be sulfonic acid, sulfonic acid and/or sulfonic acid and/or the corresponding anions or mixtures thereof. The most preferred sulfur containing group covalent surface functionalization is sulfonic acid or a sulfonic acid salt or mixtures thereof, hereinafter referred to as only sulfonic acid. Covalently attached sulfonic acid gives best dispersions of carbon nanotubes amongst the sulfur containing groups. For environmental reasons, substantially aqueous dispersions of carbon nanotubes are preferred for application of the carbon nanotube layer. For purposes of the present invention, substantially aqueous dispersions of carbon nanotubes refers to at least 60 wt % water in the dispersion. It is desirable to combine the nanotubes with a helix forming polymer so that anisotropic conduction can be combined with adequate barrier properties.

Functionalization of the single walled carbon nanotubes with these groups within these atomic percent ranges allows the preparation of stable dispersions at the solids loadings necessary to form highly conductive, transparent films by conventional coating means. This method allows for very effective dispersion in substantially aqueous dispersions and does not require a dispersion aid. Additionally, the most efficient level of functionalization will provide the desired dispersion without significantly altering the electronic properties of the carbon nanotubes.

The functionalization may be carried out by a number of routes. Typically, the raw, unfunctionalized material single walled carbon nanotubes are added to a bath of strongly oxidizing agents, for example, hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, potassium permanganate, persulfate, cerate, bromate, hydrogen peroxide, dichromate and mixtures thereof. Sulfuric acid, nitric acid, permanganate, and chlorosulfonic acids are preferred due to the efficacy of the oxidation and functionalization. Temperatures from 20° C.-120° C. are typically used in reflux of this mixture of single walled carbon nanotubes and strong oxidizing agents with appropriate agitation over 1 hr—several days process time. At the end of this process, the raw single walled carbon nanotubes are now functionalized single walled carbon nanotubes. The residual oxidizing agents are removed via separation technologies, for example, filtration wash, centrifugation, cross-flow filtration, such that a powder of the functionalized single walled carbon nanotubes, preferably with primarily carboxylic acid functionalities, remains after appropriate heating to dry.

The pH of the dispersion and the coating composition is worth noting. As the pH becomes more basic, for example, above the pKa of the carboxylic acid groups, the carboxylic acid will be ionized thereby making the carboxylate anion, a bulky, repulsive group which can aid in the stability. The preferred pH ranges from 3-10 pH, more preferably from 3-6.

The length of the single walled carbon nanotubes may be from 20 nm-1 m, more typically from 0.020 μm to 50 μm. The single walled carbon nanotubes may exist as individual single walled carbon nanotubes or as bundles of single walled carbon nanotubes. The diameter of a single walled carbon nanotube in the conductive layer may be 0.05 nm-5 nm. The single walled carbon nanotubes in bundled form may have diameters ranging from 0.01 μm-1 μm. Preferably such bundles will have diameters less than 50 nm and preferably less than 20 nm (0.02 microns or μm) and lengths of between 0.020 μm and 50 μm. It is important that higher surface area is achieved to facilitate transfer of electrons and higher available surface area is achieved by having smaller bundle sizes thereby exposing surfaces of single walled carbon nanotubes which may be at the internal position of the bundles and not accessible. The ends of the single walled carbon nanotubes may be closed by a hemispherical buckyball of appropriate size.

Alternatively, both of the ends of the single walled carbon nanotubes may be open. Some cases may find one end open and the other end closed.

The functionalized single walled carbon nanotubes are used to form aqueous dispersions with single walled carbon nanotube solids loadings in the 0.05-10 wt % (500-100000 ppm range). More preferably the single walled carbon nanotube solids loadings are 0.1-5 wt %. Most preferably the solid loadings are 0.1-1 wt % single walled carbon nanotube. This solids loading range allows for facile coating to occur and also minimizes the viscosity such that roll coating and/or inkjet printing can be performed in standard practice. Ultimate solids loading may be varied based on final desired sheet resistance. According to the present invention, the preferred sheet resistance of the barrier layer is from $1 \times 10^3$ Ohms/sq. to $1 \times 10^{10}$ Ohms/sq.

The functionalized single walled carbon nanotubes are often in powder/flake form and require energy to disperse. A typical dispersion process may use a high shear mixing apparatus, such as a homogenizer, microfluidizer, cowles blade high shear mixer, automated media mill, ball mill, for several minutes to an hour. Standard ultrasonication and bath sonication may be sufficient to disperse the functionalized single walled carbon nanotubes. Typically, a 0.1 wt % (1000 ppm) single walled carbon nanotube dispersion in deionized water is formed by bath sonication for 2-24 hrs, dependant on the level of hydrophilic functionalization. After the dispersion process, pH can be adjusted to desired range. A centrifugation or filtration process is used to remove large particulates. The resultant dispersion will be stable for several months on standing, dependant on the level of hydrophilic functionalization. This dispersion has solids loadings high enough to produce conductive coatings in single pass modes for many coating techniques.

The barrier layer of the invention should contain about 0.1 to about 1000 mg/m$^2$ dry coating weight of the functionalized single walled carbon nanotube. Preferably, the barrier layer should contain about 0.5 to about 500 mg/m$^2$ dry coating weight of the functionalized single walled carbon nanotube. This range of single walled carbon nanotube in the dry coating is easily accessible by standard coating methods, will give the best transmission properties, and minimizes cost to achieve the desired sheet resistance. The actual dry coating weight of the single walled carbon nanotubes applied is determined by the properties for the particular conductive functionalized single walled carbon nanotube employed and by the requirements for the particular application, such requirements may include, for example, the conductivity, transparency, optical density, cost, etc for the layer.

The dispersant loading in the dispersion is preferred to be minimal to none. The maximum dispersant loading is preferred to be 50 wt % of the weight of the single walled carbon nanotube. The more preferred dispersant loading is less than 5 wt % of the weight of the single walled carbon nanotube. The most preferred dispersant loading is 0 wt %. With decreasing levels of dispersant, the electronic conductivity increases. There are many dispersants which may be chosen. Preferred dispersants are octylphenol ethoxylate (TX-100), sodium dodecyl sulfate, sodium dodecylbenzenesulfonate, poly(styrene sulfonate), sodium salt, poly(vinylpyrrolidone block copolymers of ethylene oxide and propylene oxide (Pluronics or Poloxamers), Polyoxyethylene alkyl ethers (Brij 78, Brij 700), and cetyl or dodecyltrimethylammonium bromide. These dispersants are able to effectively disperse carbon nanotubes at low dispersant loadings which is preferred so that the impact on electronic conductivity is minimal. Appropriate mixtures of these dispersants may be utilized.

Conductive, metallic nanowires suitable for use in the practice of the invention may be soluble or dispersible in water. The conductive metal may be metal films include silver, gold, palladium, platinum, nickel, aluminum, copper or alloys of these materials may be supplied by synthetic routes. First, the metallic nanowire may be synthesized via a reductive precipitation from a suitable metal salt precursor in the presence of a growth directing agent. The growth directing agent may be soft or rigid. The soft growth director may be a polymer, surfactant, ion or molecule that drives growth of the precipitating metallic nanowire substantially in one direction. Alternatively, the rigid growth director may be a template structure that has features consistent with the final desired size of the nanowires.

The metallic nanowires have diameters from 2-100 nm and lengths of 100 nm-1000 microns. Preferred diameters are 2-75 nm in order to promote improved conductivity. Preferred lengths are 0.1 microns-5 microns to promote highly anisotropic particles and improve the anisotropic conductivity of the conductive films made of these materials.

The barrier layer may also include a binder for carrying or dispersing the anisotropic materials. Particularly preferred as binder materials for the barrier layer are materials such as gelatin that form a barrier between solvents or monomers in printed conductive inks and the light modulating material.

Gelatin is derived from a material called collagen. Collagen has a high content of glycine and of the imino acids proline and hydroxyproline. It has a triple helix structure made up of three parallel chains. When collagen in water is heated above a certain temperature, it will denature to form gelatin. Concentrated gelatin solutions form rigid gels when cooled. This phenomenon is known as sol-gel transition or thermal gelation and is the result of secondary bonding, such as hydrogen bonding, between gelatin molecules in solution. It should be noted that this property is not limited to gelatin; for example, aqueous solutions of agar, a polysaccharide from seaweed, will also form rigid gels upon cooling. Partial renaturation of gelatin also occurs upon cooling. The latter refers to the formation of triple helix collagen-like structures. The structures do not form if gelatin is not chill set prior to drying. In other words, molecules of gelatin remain in a random coil configuration if the coating is dried at a temperature that is above the sol-gel transition temperature. The presence of helix structures may be detected by x-ray diffraction. Chill set gelatin containing molecules in a helix configuration has relatively low solubility in cold water and organic solvents compared to the random coil gelatin. This property enables chill set gelatin to be an effective barrier between the organic solvent in printed conductive inks and the light modulating material, thereby protecting the light modulating material from subsequently applied layers.

Useful "gelatins," as that term is used generically herein, include alkali treated gelatin, for example, cattle bone or hide gelatin, and acid treated gelatin, for example, pigskin gelatin.

Other ingredients may be included in the barrier layer such as dispersed pigments for contrast control. A bacteriostat may be added to prevent gelatin degradation during storage and during material operation.

The barrier layer may be made to have anisotropic conductivity in the z-direction by use of several methodologies. Preferably, the anisotropic conductivity of the barrier layer is predominantly, if not solely, in the z-direction. If the conductive materials are coated out of a solution based dispersion onto a substrate, it is possible to produce enough shear forces such that the anisotropic materials align substantially with the major shear direction. Once the materials are aligned, an external field, for example, an electrical field or a magnetic field, may be applied to direct the materials into the z-direction. The z-direction referred to herein is the direction perpendicular to the plane of the substrate. Alternatively, without the use of shear forces, external fields may be applied to direct the materials into the z-direction. In both instances the materials may be locked in the preferred orientation of the anisotropic materials in order to achieve a film with anisotropic electronic conduction properties.

In FIG. 3a, a conductive film is shown shortly after deposition onto a substrate where alignment of the anisotropic particles is not in the z-direction and prior to sol-gel transition of the preferred gelatin binder. FIG. 3b shows the barrier layer film from FIG. 3a after application of an external field, for example, an electrical field or a magnetic field, to induce z-direction orientation of the anisotropic conductive particles.

Turning to FIG. 4, a conductive film is shown with anisotropic particles oriented in the z-direction as a result of growing the conductive particles in the z-direction to induce the preferred orientation.

The barrier layer can be applied in any of a number of well known techniques, such as dip coating, rod coating, blade coating, air knife coating, gravure coating and reverse roll coating, extrusion coating, slide coating, curtain coating, and the like. Additionally, "dry" methods may be used to form the barrier layer. Such methods are disclosed in U.S. Ser. No. 10/969,889 (Polymeric transparent conductor transfer method), U.S. Ser. No. 11/022,155 (Polymeric conductor donor & transfer method) and U.S. Ser. No. 11/062,416 (Transparent conductor transfer methods using CNT), all incorporated herein by reference.

The LCD may also comprise at least one "functional layer", in addition to the barrier layer previously described. The functional layer may comprise a protective layer. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$ ohms. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled nonconductive pigments. The materials are milled below 1 micron to form "nanopigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolopyrrole, and thioindigo, and anthriquinone pigments such as anthrapyrimidine.

The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

The liquid crystal containing composition of the invention can be applied by any of a number of well known techniques, such as dip coating, rod coating, blade coating, air knife coating, slide or bead coating, curtain coating, and the like.

After coating, the layer is generally dried by simple evaporation, which may be accelerated by known techniques such as convection heating. Known coating and drying methods are described in further detail in Research Disclosure No. 308119, Published December 1989, pages 1007 to 1008, incorporated herein by reference. The coating is maintained above the chill set temperature or sol-gel transition temperature of gelatin during drying of the imaging layer or light modulating layer to permit self-assembly of the droplets into a close-packed monolayer.

A coated sheet can be formed using inexpensive, efficient layering methods. A single large volume of sheet material can be coated and formed into various types of smaller sheets for use in display devices such as transaction cards, shelf labels, large format signage, and the like. Displays in the form of sheets in accordance with the present invention are inexpensive, simple, and fabricated using low cost processes.

In the preferred embodiment, the imaging layer or light modulating layer is first applied to a substrate and maintained above the chill set temperature or sol-gel transition temperature of gelatin. After drying, the binder in this layer is allowed to crosslink to preserve the close-packed monolayer distribution of coated droplets. A second aqueous layer containing gelatin is then applied. This second aqueous layer preferably contains anisotropic conducting particles such as carbon nanotubes or metal nanowires. The anisotropic particles are aligned by subjecting the coating to an external field such as an external magnetic field before the coating is chill set. After the anisotropic particles have been aligned by the external field, the coating of the second layer is chill set prior to drying in order to allow the gelatin molecules in the second layer to adopt a helix structure A screen printed conductive ink is then applied over the second layer to complete construction of the device. In a preferred commercial embodiment, the substrate to be coated is in the form of a moving web. After completing the manufacture of a coated liquid crystal sheet material between spaced electrodes, the sheet material can be cut into a plurality of smaller, individual areas for use in various display or other applications.

A close-packed monolayer of uniform thickness may provide enhanced performance with respect to surface roughness. In conventional liquid crystal coatings containing non-uniform droplets or capsules, the root mean square (RMS) surface roughness has been measured at about 6 microns. This is a very high value of surface roughness that would result in irregular or incomplete curing if a UV curable screen printed conducive ink is used as the second electrode. The irregular curing will result in increased switching voltages. Furthermore, a surface roughness of this magnitude will also result in significant non-uniformity of switching voltage across the area of the display since the switching voltage is directly related to the thickness of the coated layer. The self-assembled droplets or domains in the present close-packed monolayer demonstrates a RMS surface roughness of less than 1.5 microns, more preferably less than 1.0 microns and most preferably less than 0.5 microns.

The following examples are provided to illustrate the invention.

EXAMPLE 1

Control

This example describes fabrication and performance of a control device. A control device was constructed according to the format shown in FIG. 5. The chiral nematic liquid crystal material MDA-01-1955 was combined with MDA-00-3506 (both obtained from Merck, Darmstadt, Germany) to create a mixture having a reflection wavelength centered at 590 nm. A limited coalescence dispersion of this mixture in water was then prepared with mean droplet size close to 10 μm. The dispersion was combined with an aqueous solution of fish skin gelatin and a suitable cross-linking agent for gelatin and spread at room temperature onto a plastic surface covered with indium tin oxide (ITO). The droplets of liquid crystal self-assembled upon drying to create a close-packed monolayer. The gelatin was allowed to cross-link to preserve the close-packed architecture. A barrier layer containing aqueous gelatin and carbon black was then coated over the liquid crystal layer. The concentration of carbon black in the barrier layer was 35 wt % relative to gelatin. The gelatin in the barrier layer was chill set prior to drying. The dried thickness of the barrier layer was about 1 μm. The resistivity of the barrier layer was determined to be $1.5 \times 10^9$ ohms/sq using a parallel electrode fixture according to ASTM D257 with a test voltage of 10 volts DC. A silver ink composition was then screen printed over the barrier layer and allowed to cure to complete construction of the device.

The electro-optic response of the device is shown in FIG. 6. The horizontal axis indicates the amplitude of the addressing voltage pulse, and the vertical axis indicates reflectance measured at 0 V and 2 s after application of the voltage pulse. The latter was a square wave with a frequency of 1000 Hz and duration of 100 ms. Reflectance was measured using an X-rite 938 spectrodensitometer. The open triangles represent the response when the CLC material was initially in the planar texture and the closed circles represent the response when the material was initially in the focal conic state. The device exhibits a maximum driving voltage of approximately 65 volts and there is no evidence of field spreading. In other words, it is possible to create a matrix display based on this construction but the maximum driving voltage is still relatively high.

EXAMPLE 2

Control

This example describes fabrication and performance of a second control device. Construction of this device was similar to that described in Example 1 except that the mean size of the liquid crystal droplets was 7.5 μm instead of 10 μm. Furthermore, the dried thickness of the barrier layer was 0.6 μm instead of 1.0 μm and the concentration of carbon black in the barrier layer was 50 wt % relative to gelatin instead of 35 wt %. The resistivity of the barrier layer was determined to be $1.6 \times 10^6$ ohms/sq using a parallel electrode fixture according to ASTM D257 with a test voltage of 10 volts DC.

Figure 7:
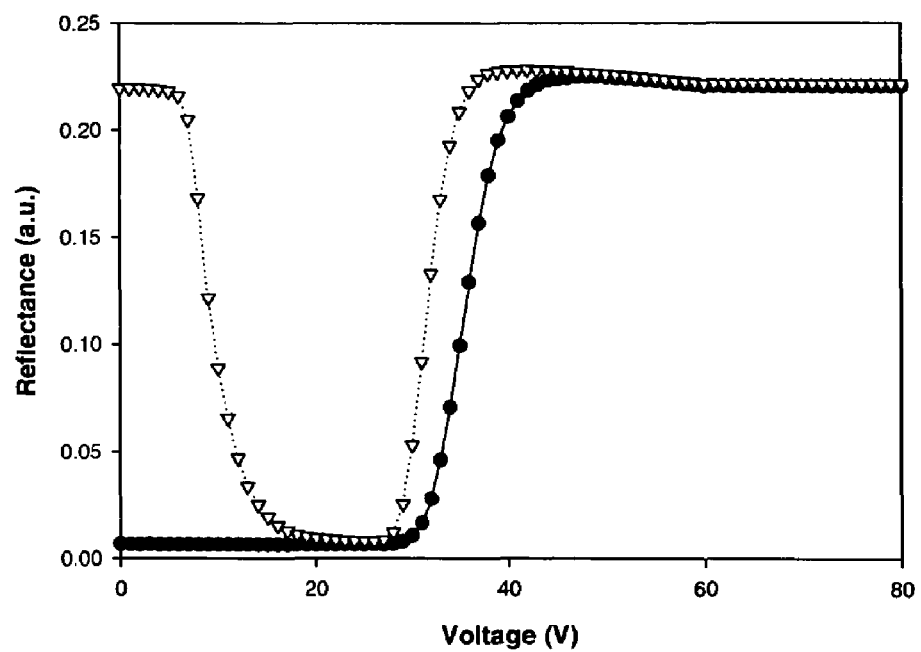
FIG. 7 illustrates the electro-optic response of a second control device.

The electro-optic response of this device was measured in the same manner as described previously under Example 1 and is shown in FIG. 7. The maximum drive voltage in this case is about 45 volts. However, there is significant conduction in the x-y plane as evidenced by undesirable field spreading. In other words, the electro-optic response is not confined to the activated patch or pixel but spreads out in a direction parallel to the electrodes. It is not possible to create a matrix display based on this construction in spite of the low voltage. The undesirable field spreading is caused by the high concentration of the isotropic conductive carbon black in the barrier layer.

EXAMPLE 3

Invention

This example illustrates fabrication of a device according to the method of the invention. The chiral nematic liquid crystal material MDA-01-1955 is combined with MDA-00-3506 (both obtained from Merck, Darmstadt, Germany) to create a mixture having a reflection wavelength centered at 590 nm. A limited coalescence dispersion of this mixture in water is then prepared with mean droplet size close to 10 μm. The dispersion is combined with an aqueous solution of fish skin gelatin and a suitable cross-linking agent for gelatin and spread at room temperature onto a plastic surface covered with indium tin oxide (ITO). The droplets of liquid crystal self-assemble upon drying to create a close-packed monolayer. The gelatin is allowed to cross-link to preserve the close-packed architecture. A barrier layer containing aqueous gelatin, 5 wt % carbon nanotubes, such as functionalized carbon nanotubes P3 from Carbon Solutions, Inc., and a black pigment composition is then coated over the liquid crystal layer. The coating is subjected to a magnetic field prior to chill setting to align the carbon nanotubes. After alignment, the gelatin in the barrier layer is chill set to and dried to achieve the necessary barrier properties. A silver ink composition is then screen printed over the barrier layer and allowed to cure to complete construction of the device. The maximum drive voltage in this case is about 45 volts. However, the conduction in the x-y plane, evidenced by undesirable field spreading, is not observed. The electro-optic response is confined to the activated patch or pixel and does not spread out in a direction parallel to the electrodes.

The invention has been described in detail with particular reference to certain preferred embodiments thereof, but it will be understood that variations and modifications can be effected within the spirit and scope of the invention.

The invention claimed is:

1. A high contrast reflective display comprising a substrate, at least one electronically modulated imaging layer, wherein said electronically modulated imaging layer comprises a uniformly thick, close-packed, ordered monolayer of domains of electrically modulated material in a fixed polymer matrix, at least one barrier layer, wherein said barrier layer is conductive in a direction perpendicular to said substrate, and at least one electrically conductive layer.

2. The high contrast reflective display of claim 1 wherein said electrically modulated material comprises a bistable chiral nematic liquid crystal layer.

3. The high contrast reflective display of claim 1 wherein said at least one uniformly thick, close-packed, ordered monolayer of electrically modulated material is a uniformly thick, hexagonally close packed monolayer of light modulating material.

4. The high contrast reflective display of claim 1 wherein said electronically modulated imaging layer has a thickness of 5 μm.

5. The high contrast reflective display of claim 1 wherein said at least one barrier layer comprises at least one anisotropic conductor.

6. The high contrast reflective display of claim 5 wherein said at least one anisotropic conductor comprises carbon nanotubes or metal nanowires.

7. The high contrast reflective display of claim 6 wherein said carbon nanotubes are functionalized.

8. The high contrast reflective display of claim 7 wherein said functionalized carbon nanotubes are functionalized with at least one member selected from the group consisting of carboxylic acid, carboxylate anion, hydroxyl or sulfur containing groups, carbonyl, phosphates, nitrates and combinations thereof.

9. The high contrast reflective display of claim 7 wherein said functionalized carbon nanotubes are functionalized with a covalent surface functionalization comprising carboxylic acid, carboxylic acid salt or mixtures thereof.

10. The high contrast reflective display of claim 7 wherein said functionalized carbon nanotubes have a functionalized percent range of from 0.5 to 5 atomic percent.

11. The high contrast reflective display of claim 7 wherein said functionalized carbon nanotubes are functionalized with a sulfur containing group selected from:

wherein R is a carbon within the lattice of a single walled carbon nanotube;
x ranges from 1-3;
Z may be a Hydrogen atom or a metal cation such metals as Na, Mg, K, Ca, Zn, Mn, Ag, Au, Pd, Pt, Fe, Co; and
y ranges from 0-1.

12. The high contrast reflective display of claim 11 wherein said sulfur containing groups comprise at least one member selected from the group consisting of sulfonic acid, sulfonic acid and the corresponding anions or mixtures thereof.

13. The high contrast reflective display of claim 7 wherein said functionalized carbon nanotubes are functionalized with a covalent surface functionalization comprising sulfonic acid or a sulfonic acid salt or mixtures thereof.

14. The high contrast reflective display of claim 7 wherein said functionalized carbon nanotubes are functionalized at any point on the single walled carbon nanotube, that is, on the external or internal surface, open or closed end, or sidewall.

15. The high contrast reflective display of claim 6 wherein said carbon nanotubes have minimal or no carbonaceous impurities or metal impurities.

16. The high contrast reflective display of claim 6 wherein said carbon nanotubes are single walled carbon nanotubes.

17. The high contrast reflective display of claim 16 wherein said single walled carbon nanotubes are metallic single walled carbon nanotubes.

18. The high contrast reflective display of claim 16 wherein said single walled carbon nanotubes are prepared by applying a mixture containing:
a) a single walled carbon nanotube according to Formula I;

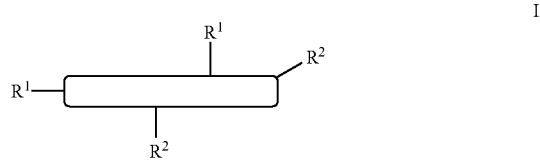

wherein each of $R^1$ and $R^2$ independently represents carboxylic acid, carboxylate anion, hydroxyl or sulfur containing groups, carbonyl, phosphates, and/or nitrates, and the tube is a single wall carbon nanotube composed of carbon atoms substantially in hexagonal configuration,
b) dispersant; and
c) a polymeric binder;
wherein the $R^1$ and $R^2$ substituents may be uniformly or non-uniformly distributed across each single walled carbon nanotube.

19. The high contrast reflective display of claim 1 wherein said single walled carbon nanotubes comprise a bundle of single walled carbon nanotubes.

20. The high contrast reflective display of claim 6 wherein said metal nanowires.

21. The high contrast reflective display of claim 1 wherein said metal nanowires comprise silver, gold, palladium, platinum, nickel, aluminum, copper or alloys thereof.

22. The high contrast reflective display of claim 1 wherein said barrier layer has anisotropic conductivity solely in the z-direction.

23. The high contrast reflective display of claim 1 wherein said barrier layer further comprises a binder.

24. The high contrast reflective display of claim 7 wherein said binder comprises polymer in a helix configuration.

25. The high contrast reflective display of claim 7 wherein said binder comprises gelatin.

26. The high contrast reflective display of claim 1 further comprising at least one conductive layer.

27. The high contrast reflective display of claim 26 wherein said barrier layer is located between said electronically modulated imaging layer and said at least one conductive layer.

28. The high contrast reflective display of claim 1 wherein said at least one conductive layer comprises a first conductive layer located between said support and said electronically modulated imaging layer and a second conductive layer located on the side of said electronically modulated imaging layer opposite said support, wherein said barrier layer is located between said electronically modulated imaging layer and said second conductive layer.

29. The high contrast reflective display of claim 1 wherein said second conductive layer comprises screen-printed conductive ink.

30. The high contrast reflective display of claim 1 wherein said high contrast reflective display utilizes a driving voltage of less than 50 volts.

31. A method of making a high contrast reflective display comprising:
- providing a substrate;
- applying a first conductive layer;
- applying at least one layer of domains of electrically modulated material in a polymer matrix;
- drying the at least one applied layer of said domains of electrically modulated material in a polymer matrix at a temperature above the chill set temperature or sol-gel transition temperature of said polymer matrix to permit self-assembly of said domains of electrically modulated material into a close-packed monolayer of said domains of electrically modulated material; and fixing said polymer matrix to preserve said close-packed monolayer of domains of electrically modulated material;
- applying a barrier layer comprising anisotropic particles;
- orienting said anisotropic conductor to produce a barrier layer conductive in a direction perpendicular to said substrate; and
- applying a second conductive layer.

32. The method of claim 31 wherein said at least one anisotropic conductor comprises carbon nanotubes or metal nanowires.

33. The method of claim 32 wherein said carbon nanotubes are functionalized.

34. The method of claim 33 wherein said functionalized carbon nanotubes are functionalized with a covalent surface functionalization comprising carboxylic acid, carboxylic acid salt or mixtures thereof.

35. The method of claim 33 wherein said functionalized carbon nanotubes are functionalized with a covalent surface functionalization comprising sulfonic acid or a sulfonic acid salt or mixtures thereof.

36. The method of claim 32 wherein said carbon nanotubes are single walled carbon nanotubes.

37. The method of claim 31 wherein said barrier layer further comprises a binder.

38. The method of claim 37 wherein said binder comprises gelatin.

39. A method of making a high contrast reflective display comprising:
- providing a substrate;
- applying a conductive layer;
- applying at least one layer of domains of electrically modulated material in a polymer matrix;
- drying the at least one applied layer of said domains of electrically modulated material in a polymer matrix at a temperature above the chill set temperature or sol-gel transition temperature of said polymer matrix to permit self-assembly of said domains of electrically modulated material into a close-packed monolayer of said domains of electrically modulated material; and fixing said polymer matrix to preserve said close-packed monolayer of domains of electrically modulated material;
- applying a barrier layer comprising anisotropic particles; and
- orienting said anisotropic particles to produce a barrier layer conductive in a direction perpendicular to said substrate.

40. The method of claim 39 wherein said conductive layer is applied after said barrier layer.

* * * * *